March 31, 1942.   W. S. EATON   2,277,906
PHASE INDICATOR
Filed Jan. 30, 1939
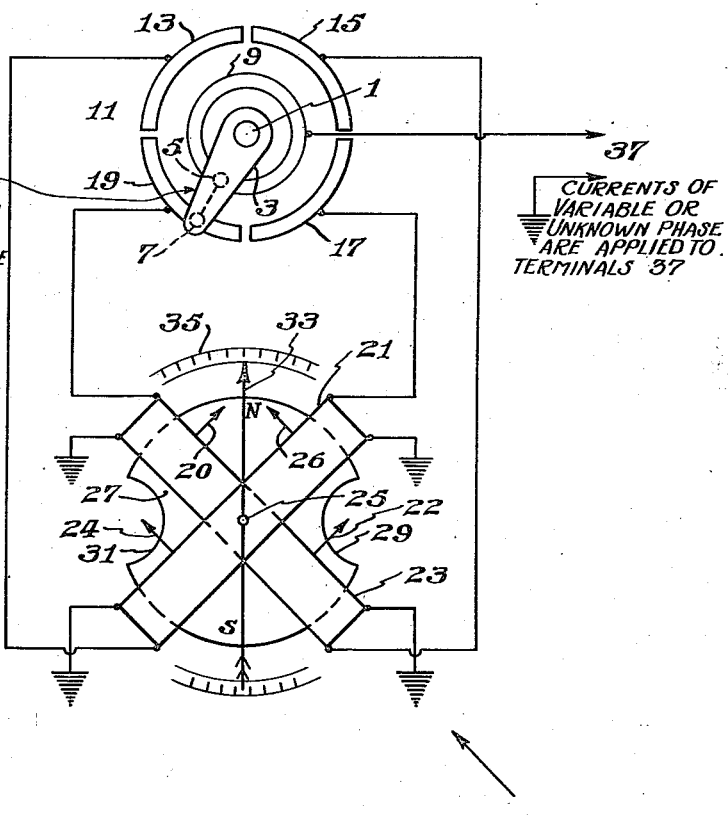
FIG. 1.
ROTATES IN SYNCHRONISM WITH DEVICE PRODUCING CURRENTS OF VARIABLE OR UNKNOWN PHASE
CURRENTS OF VARIABLE OR UNKNOWN PHASE ARE APPLIED TO TERMINALS 37
FIG. 3.
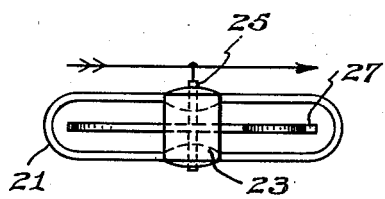
FIG. 2.
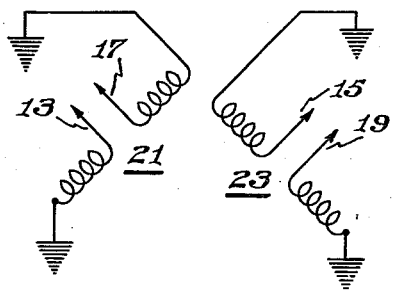
Inventor
Warren S. Eaton
By
Attorney Patented Mar. 31, 1942

2,277,906

UNITED STATES PATENT OFFICE 2,277,906

PHASE INDICATOR

Warren S. Eaton, Los Angeles, Calif., assignor to Radio Corporation of America, a corporation of Delaware Application January 30, 1939, Serial No. 253,708

6 Claims. (Cl. 172—245)

My invention relates to bearing indicators for radio compasses and, more especially, to a phase indicator which operates through 360°. Numerous types of bearing indicator devices have been proposed. Many of these devices are complicated in their structural arrangement and others are incapable of indicating throughout 360°. The present invention has for one of its objects the provision of means for indicating bearings throughout 360°. Another object is to provide a simple, light and inexpensive instrument for indicating radio bearings. A still further object is to provide means for indicating the direction and sense of radio bearings.

The invention will be described by referring to the accompanying drawing, in which Figure 1 is a schematic circuit diagram representing one embodiment of the invention;

Figure 2 is an end view of the coil and armature arrangement of the indicator looking in the direction of the arrow in Figure 1; and Figure 3 is a schematic diagram illustrating the coil connections.

Referring to Fig. 1, a rotatable shaft 1 has secured to it a rotating member 3. The rotating member is preferably insulated and carries brushes 5, 7 which contact respectively a slip ring 9 and a commutator 11. The commutator includes four segments 13, 15, 17, 19. Each of the diagonally disposed segments 13, 17 are connected to terminals of bifilar-wound field coils 21. The remaining terminals of the field coils are grounded. The other diagonally disposed segments 15, 19 are connected to terminals of second bifilar-wound field coils 23. The remaining terminals of the second-mentioned field coils are grounded. The field windings are arranged to intersect at their centers at an angle of 90°. A shaft 25 is arranged at the centers of the coils. An armature 27 is mounted on the shaft 25, whereby the armature may be rotated within the field coils. The armature, which is polarized as indicated by the reference letters N, S, includes cut-out segments 29, 31. A pointer 33, which cooperates with a 360° scale 35, is arranged to rotate with the armature. The axis or shaft 25 is arranged in suitable bearings which are not shown.

Although bifilar windings are not essential, I prefer windings of this type because the fields may be made more nearly symmetrical, which is a desirable condition in an indicator of the present type. If bifilar windings are employed, the turns are of necessity in the same direction and the terminal connections are arranged as indicated in Fig. 3. The directions of the currents through each winding of a pair of the bifilar windings are arranged so that the alternating currents applied thereto establish forces which operate in the same sense on the polarized armature as indicated by the small arrows 20, 22, 24, 26.

In the operation of the instrument, the brush member 3 is rotated preferably at a uniform velocity, of the order of 15 revolutions per second. The alternating currents whose phase is to be indicated are applied to the slip ring 9 and to ground by connections 37. These alternating currents, having an unknown phase, which depends upon the rotation of shaft 1, are applied successively through the segments 13, 15, 17, and 19 to the field coils. Since the terminal connections of the field windings are made in order and in synchronism with the alternations of the alternating current, and since each pair (13—17) (15, 19) of coils is reversely wound, the resultant magnetic fields will operate in pairs as indicated by the arrows 20, 22, 24 and 26 during each revolution of the arm 3 to move the polarized armature to an indicating position, at which the averages applied forces balance. The cut-out segments 29, 31 are employed to apply any correction which may be required by unavoidable asymmetry of the fields.

Thus, the invention has been described as a bearing-indicating instrument in which currents are applied to crossed coils by means of a brush and commutator device which rotates synchronously at the frequency of the alternating currents whose phase is to be measured. The instrument consists of pairs of bifilar-wound coils which intersect at an angle of 90° at their centers. The magnetic fields established within the coils orient the armature as a function of the phasal relation of the applied currents, and the reference phase established by the brush and commutator, and thereby indicate the phase. While the angle of intersection of the coils has been specified as 90°, it should be understood that any suitable angular arrangement may be employed. One useful application of a device of the character described is for the measurement of radio bearings in the manner described in my copending application Serial No. 253,707 filed January 30, 1939, and entitled "Radio direction finder."

I claim as my invention:

1. In a phase indicator two pairs of interwound coils angularly disposed about a common axis perpendicular to the coil axes and being capable of establishing four overlapping magnetic fields each of substantially equal strength and differently oriented about said center, a polarized disc shape armature located within said coils and arranged with its axis of rotation located at said common axis for rotational movement upon application of forces derived from said fields; and means for applying successively varying currents to said coils in synchronism with said variations.

2. In a phase indicator, two sets of angularly disposed bifilar wound and partially overlapping coils having a common axis perpendicular to the coil axes and capable of establishing a plurality of overlapping magnetic fields each of substantially equal strength and differently oriented with respect to said center, a polarized disc-like armature located within said coils and arranged with its axis of rotation at the said axis of said fields for rotary movement upon application of forces derived from said fields, an indicator in operable engagement with said armature, and means for applying successively varying currents to said coils in synchronism with said variations.

3. In a phase indicator, interwound pairs of angularly disposed partially overlapping coils having a common axis perpendicular to the coil axes and being capable of creating a plurality of separate magnetic fields, each of equal strength and of different orientation in a common plane, a polarized disc located within said coils with its axis at said common axis and rotationally responsive to the forces of said fields, and means for applying successively varying currents to said coils.

4. In a phase indicator, two pairs of bifilar wound partially overlapping coils for establishing four magnetic fields, said coils being arranged to establish coplanar fields in 90° relationship, a polarized disc located symmetrically within said coils with its axis at the axis of intersection of said fields and rotatable upon application of the forces of said fields, and means for applying currents to said coils so that said forces rotate said member to a position in which the effect of the fields is balanced.

5. An indicator including, in combination, pairs of bifilar wound partially overlapping field coils capable of establishing coils of equal strength upon application of equal currents and arranged so that the axes of said fields intersect at an angle and lie in a common plane, a polarized disc-shape armature having its axis intersecting said plane at said intersection and arranged for rotation by the application of forces from said fields, and means for applying successively, currents, whose phase is to be indicated, to said pairs of field coils.

6. In a device as set forth in claim 1, means for compensating for the effect of asymmetrical fields.

WARREN S. EATON.